T. SPORE.
CAR LOADING DEVICE.
APPLICATION FILED APR. 5, 1910.

980,692.

Patented Jan. 3, 1911.
2 SHEETS—SHEET 1.

Inventor
Theodore Spore,
By Victor J. Evans
Attorney

Witnesses
Thos. F. Knox,
John A. Donegan

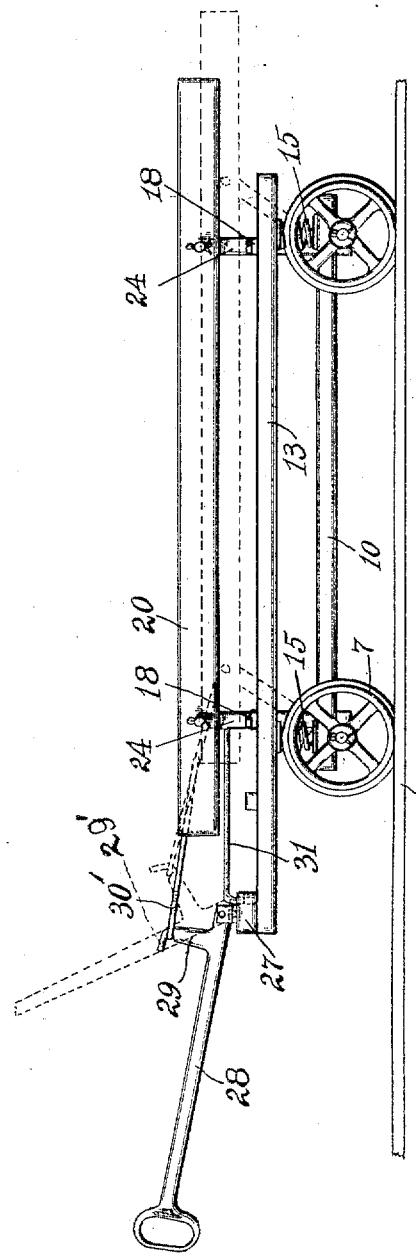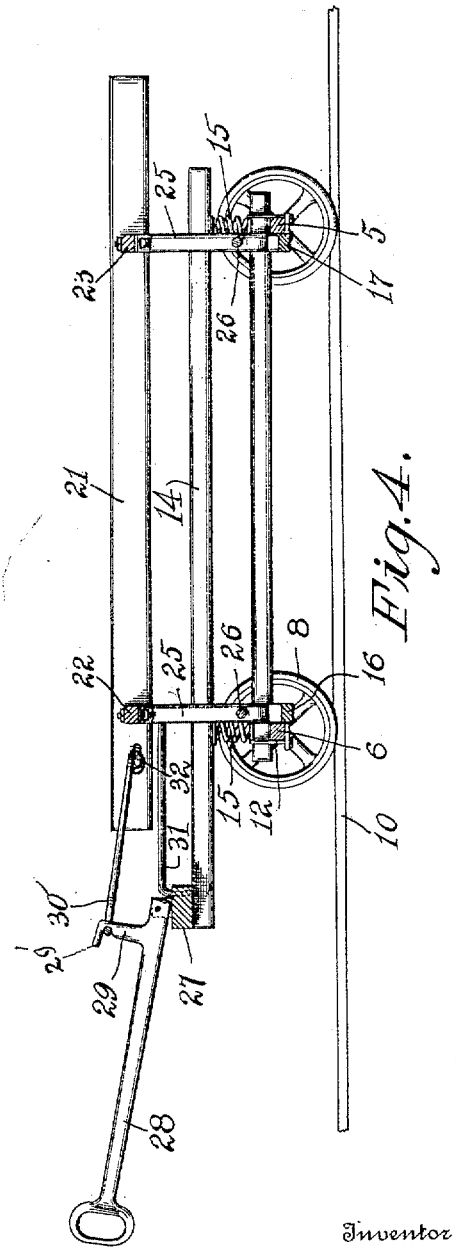

UNITED STATES PATENT OFFICE.

THEODORE SPORE, OF KINGSTON, NEW YORK.

CAR-LOADING DEVICE.

980,692.  Specification of Letters Patent.  Patented Jan. 3, 1911.

Application filed April 5, 1910.  Serial No. 553,562.

*To all whom it may concern:*

Be it known that I, THEODORE SPORE, a citizen of the United States, residing at Kingston, in the county of Ulster and State of New York, have invented new and useful Improvements in Car-Loading Devices, of which the following is a specification.

This invention relates to improvements in cars and trucks and more particularly to the type employed for transporting plastic bodies in a green or fresh state from the mold to the drying shelf.

One object of the invention is the provision of a car or truck wherein it will be necessary to handle the blocks only at the time of loading them onto the car, the car being so constructed that upon arriving at the drying or curing shelf certain parts of the car may be operated to enable the car to automatically deposit its load onto the drying or curing shelf.

With these and other objects in view, which will more fully hereinafter appear, the present invention consists in certain novel details of construction and arrangement of parts hereinafter fully described, illustrated in the accompanying drawings and more particularly pointed out in the appended claims, it being understood that various changes in the form, proportion, size, and minor details of the device may be made, within the scope of the appended claims, without departing from the spirit or sacrificing any of the advantages of the invention.

Figure 1:
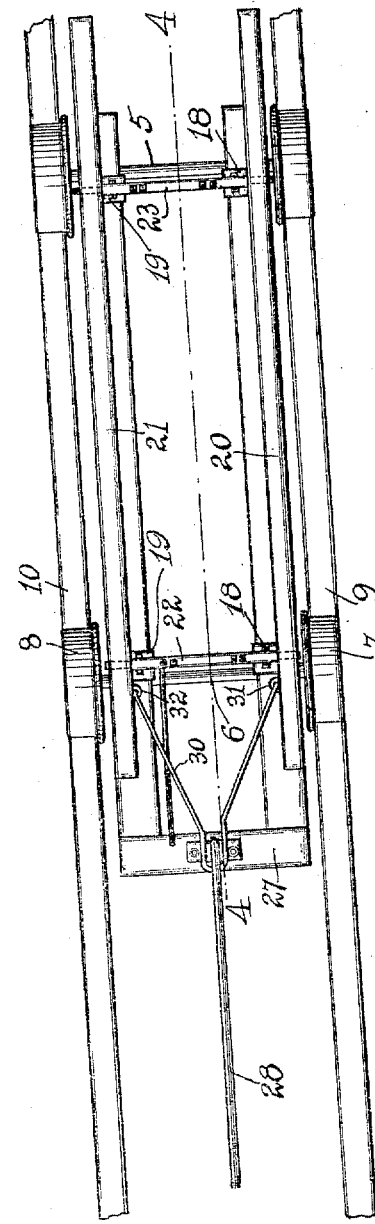
Figure 2:
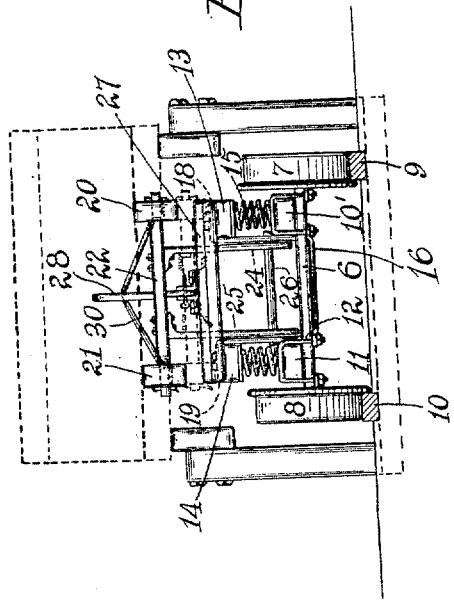

In the accompanying drawings, forming a part of the specification:—Figure 1 is a plan view of the device. Fig. 2 is an end elevation of the same. Fig. 3 is a side view. Fig. 4 is a longitudinal sectional view approximately on the line 4—4 of Fig. 1.

Similar numerals of reference are employed to designate corresponding parts throughout.

The device is intended for use with a drying or curing frame the sides of which are arranged on the opposite sides of the track upon which the car travels, the said sides being a trifle farther above the ground than the pivoted body of the car when the said pivoted body is in lowered position, all of which will be explained more in detail as the description proceeds.

The car or truck forming the subject matter of the present invention includes in its construction a pair of axles designated by the numerals 5 and 6, these axles having journaled on their outer end portions flange bearing wheels 7 and 8 designed to travel upon a track the rails of which are designated by the numerals 9 and 10. The axles 5 and 6 may be spaced apart for any distance according to the required length of the car or truck and are connected together by means of a pair of reach bars 10' and 11, the reach bars being secured to the axles by clevises 12 or in any other preferred manner. The reach bars will subsequently be termed the supporting frame, since the weight of the structure about to be described and the load to be placed thereon will be borne by the said reach bars.

What will subsequently be termed an auxiliary support comprises a pair of side bars designated by the numerals 13 and 14. These members are somewhat greater in length than the length of the reach bars 10' and 11 and are arranged above the said reach bars 10' and 11 and held in spaced relation thereto by means of four helical compression springs designated by the numeral 15, the opposite ends of the said springs bearing on the opposed surfaces of the reach bars 10' and 11, and side bars 13 and 14.

The side bars of the auxiliary support are connected together adjacent to their opposite end portions by means of a pair of U-shaped yokes 16 and 17. These members have their portions adjacent to the terminals of opposite limbs flexed outwardly, as shown at 18 and 19 and are bolted or otherwise secured to the upper surfaces of the side bars 13 and 14 of the auxiliary support, while the arms of the yokes extend vertically downward to points in alinement with the axles 5 and 6.

The body upon which the load is placed is shown to include in its construction a pair of side members 20 and 21 corresponding approximately to the length of the side bars of the supporting frame. These side members are normally positioned above the auxiliary support and are connected together adjacent their opposite ends by means of cross pieces 22 and 23. Secured to each of the cross pieces and depending therefrom are a pair of hangers 24 and 25, the lower end portions of which are provided with alining openings which receive shafts 26, the opposite end portions of which extend beyond the outer faces of the hangers 24 and 25 and are journaled in openings located at the medial portions of the arms of the U-shaped yokes 16 and 17. The hangers 24 and 25 are of such length that when they extend vertically downward the body will be located considerably above the auxiliary support, and by virtue of the connection between the body and yokes, it will be evident when the body is swung in the direction of the length of the truck or car that it will descend and bear on the auxiliary support.

In order that the body may be held against swinging movement when the car is transporting its load from the mold to the drying shelf the following construction is employed:—By reference now to the drawings it will be seen that what will subsequently be termed the forward ends of the side bars 13 and 14 of the auxiliary support are connected by a cross piece 27 and pivoted at one end to the medial portion of this cross piece is the shank 28 of a handle. Rising from the upper side of the shank 28 and adjacent to the pivotal point thereof is an arm 29, which terminates in an extension 29' extending toward the free end of the handle 28, the said extension being reduced in thickness and constituting a hook. A bail is designated in general by the numeral 30' and has its opposite ends engaged by eyes 31 and 32 secured to the inner faces and adjacent to the forward ends of the side members 20 and 21 of the body. The bail is of such length that when the shank is in substantially a horizontal plane and extends in advance of the car or truck and is moved into engagement with the hook formed in the handle, the body will be held in raised position, as shown by full lines in Fig. 3. When, however, the handle is moved rearwardly and likewise the hook, the body will be permitted to swing rearwardly on the hangers, whereby it will descend, as shown by dotted lines in Fig. 3. It will be observed when the handle is in horizontal position, as before described and the bail in engagement with the hook that rearward swinging movement of the body will be prevented and forward swinging movement will be prevented by a stop 31, one end of which is secured to the cross piece 27 and the opposite end in engagement with the cross piece 22 connecting the forward end portion of the side members 20 and 21 of the body.

It will be evident from the foregoing and when the parts are in the position as shown in Fig. 2 that a plurality of blocks of greater length than the width of the car may be placed on the body and transported to the frame, as shown in Fig. 2. Upon arrival at the frame the blocks owing to the position of the body will move over the frame to the required place, after which the handle is swung rearwardly, whereupon the body will descend and the opposite end portion of the blocks engage with the opposite sides of the frame, as shown by dotted lines in Fig. 2. After the blocks are lowered upon the frame the car may be run forwardly and returned for a new load.

From the foregoing it is evident that I have provided a device which is comparatively simple in structure and inexpensive in manufacture, embodying few parts and these so arranged that the danger of derangement will be reduced to a minimum.

I claim:—

1. A car comprising a supporting frame upon wheels, an auxiliary support yieldingly held by the supporting frame, and a body pivotally connected with the auxiliary support.

2. In a car of the class described, a supporting frame upon wheels, an auxiliary support located above the supporting frame mounted upon wheels and yieldingly connected thereto, a body positioned above the auxiliary support, and a pivotal connection between the body and auxiliary support.

3. In a car of the class described the combination with a yielding support mounted upon wheels; of a body pivotally connected to said yielding support and movable in a vertical plane and located above said yielding support, and coöperating means carried by the said yielding support and body adapted when moved into engagement to prevent movement of the body.

In testimony whereof I affix my signature in presence of two witnesses.

THEODORE SPORE.

Witnesses:
CHARLES R. VAN ETTEN,
HENRY R. DE WITT.